(12) United States Patent
Mende et al.

(10) Patent No.: US 7,228,762 B2
(45) Date of Patent: Jun. 12, 2007

(54) TRAVELING GEAR FOR AGRICULTURAL WORKING MACHINE

(75) Inventors: Ingo Mende, Dresden (DE); Henri Scholtke, Obergurig (DE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/151,094

(22) Filed: Jun. 13, 2005

(65) Prior Publication Data

US 2005/0272557 A1 Dec. 8, 2005

Related U.S. Application Data

(62) Division of application No. 10/405,428, filed on Apr. 2, 2003, now Pat. No. 6,953,416.

(30) Foreign Application Priority Data

Apr. 3, 2002 (DE) ............................... 102 14 598

(51) Int. Cl.
*F16H 47/02* (2006.01)
(52) U.S. Cl. .................. 74/733.1; 74/731.1
(58) Field of Classification Search ............. 74/730.1, 74/731.1, 732.1, 733.1; 477/107, 115
See application file for complete search history.

(56) References Cited

U.S. PATENT DOCUMENTS

| | | | |
|---|---|---|---|
| 4,606,313 A * | 8/1986 | Izumi et al. ................ 123/386 |
| 4,651,451 A * | 3/1987 | Beeley et al. ................ 37/219 |
| 4,769,774 A | 9/1988 | Narita et al. |
| 4,803,969 A * | 2/1989 | Hiereth et al. ............. 123/561 |
| 5,307,631 A * | 5/1994 | Tatsumi et al. ............. 60/452 |
| 5,335,750 A * | 8/1994 | Geringer et al. ........... 180/307 |
| 5,890,468 A | 4/1999 | Ozawa |
| 5,899,541 A * | 5/1999 | Ying et al. ................. 305/115 |
| 6,090,005 A * | 7/2000 | Schmidt et al. ................ 475/5 |
| 6,170,587 B1 * | 1/2001 | Bullock ..................... 180/69.6 |
| 6,202,783 B1 | 3/2001 | Taylor et al. |

FOREIGN PATENT DOCUMENTS

JP 01-116371 5/1989

* cited by examiner

*Primary Examiner*—Ha Ho
(74) *Attorney, Agent, or Firm*—Rebecca Henkel

(57) ABSTRACT

A method of regulating a travelling speed of an agricultural machine includes providing a diesel engine to drive a variable displacement pump, the variable displacement pump connected by a hydraulic line to at least one hydraulic motor connected to a running gear so as to drive the agricultural machine at the travelling speed. The method further includes measuring a speed of the diesel engine, and providing a delivery volume from the variable displacement pump via the hydraulic line to the at least one hydraulic motor in proportion to the measured speed of the diesel engine, where a speed of the at least one hydraulic motor controls the travelling speed of the agricultural machine.

1 Claim, 1 Drawing Sheet

TRAVELING GEAR FOR AGRICULTURAL WORKING MACHINE

CROSS REFERENCE TO RELATED APPLICATIONS

This Patent Application is a Divisional of, and claims priority to under 35 U.S.C. §120, U.S. patent application Ser. No. 10/405,428, filed on Apr. 2, 2003, now U.S. Pat. No. 6,953,416 entitled, "Traveling Gear For Agricultural Working Machine" and having Ingo Mende and Henri Scholtke as the Inventors. The full disclosure of U.S. patent application Ser. No. 10/405,428 is hereby fully incorporated by reference.

FIELD OF INVENTION

The invention concerns a travelling gear for an agricultural working machine, in particular for a self-propelled harvesting machine, with control of the travelling speed by adjusting the engine speed to the planned driving for road travel.

BACKGROUND OF THE INVENTION

From the published application for a patent DE 199 21 697 A1 a procedure and a device for setting the engine speed on a driving engine on a working machine is known, which is characterised by the application of a set value for the travelling speed for transportation or road travel for setting the engine speed. This setting of the engine speed takes place according to the position of a throttle lever, which sets the travelling speed of the working machine. An automatic transmission holds this preset travelling speed under heavier loading of the machine by regulating the power of the driving engine. A change of speed is obtained by moving the throttle lever. For this a hand must be removed from the steering wheel. Forwards and backwards travel and the speed are selected with the throttle lever, which controls the variable displacement pump mechanically or via an electronic device.

SUMMARY OF INVENTION

The task of the invention is to find a travelling gear for an agricultural working machine with control of the speed for road travel by controlling the central driving gear.

The solution to this task is the subject of the invention disclosed in the first claim. Further expedient embodiments of the invention are the subject of the subclaims.

In the case of a travelling gear in accordance with the invention for an agricultural working machine with control of the travelling speed when driving on roads with a diesel engine as the central source of power, a variable displacement pump and at least one hydraulic motor, the delivery volume of the variable displacement pump and with it the travelling speed when driving on the road are dependent upon the current position of an accelerator pedal. The speed of the diesel engine is controlled by an electronic accelerator pedal.

The travelling gear has a diesel engine as its central motive power source for all the working processes of the machine, a variable displacement pump, the delivery volume of which is adjustable electrically, driven by the diesel engine, an electro hydraulic motor which has an adjustable induction volume and two electro hydraulic motors which are switchable in their induction volume. The control range of the diesel engine begins at a very low idling speed of 500 rpm. The desired travel forwards or backwards is determined by moving the throttle lever. If the speed of the diesel engine is increased by operating the accelerator pedal, the change in speed is measured electronically with a speed sensor. It can also be measured hydraulically via a jet combination in the variable displacement pump.

If a certain dead range, which gives security against unwanted transport movement, above the idling speed is exceeded, the delivery volume of the variable displacement pump is increased in accordance with the measured change in speed and the harvesting machine travels according to the position of the throttle lever. If the speed is lowered by operating the accelerator pedal, the displacement volume of the variable displacement pump is reduced in accordance with the measured speed. Thus a speed is produced always in accordance with the accelerator pedal position. Through the sequential change in displacement of the variable displacement pump from small to large delivery volumes and the displacement of the motor from large to small induction volumes there arises a correspondingly large transformation range of torque and travelling speed.

The adjusting motor is automatically regulated by means of an internal pressure measurement from an adjustable pressure to a large induction volume, in order to achieve high moments when accelerating. According to the selected speed range, the two switchable motors are switched to a small or large induction volume. Acceleration of the vehicle can be determined through the control electronics or by changing of the jet combination depending upon the vehicle mass and requirements. Deceleration of the travelling gear takes place by reducing the speed of the diesel engine, as a result of which the variable displacement pump is swung back in the direction of a minimum induction volume (through the measured change in speed) and the vehicle is braked. While doing so, the driver can keep both hands on the steering wheel and he no longer needs to operate the throttle lever. If the vehicle is braked down to idling speed in this manner, also no unwanted transport movement can occur through deflection of the throttle lever.

BRIEF DESCRIPTION OF THE DRAWINGS

The invention will now be described further, by way of example, with reference to the accompanying drawing, in that.

DETAILED DESCRIPTION OF THE PREFERRED EMBODIMENT

Figure 1:
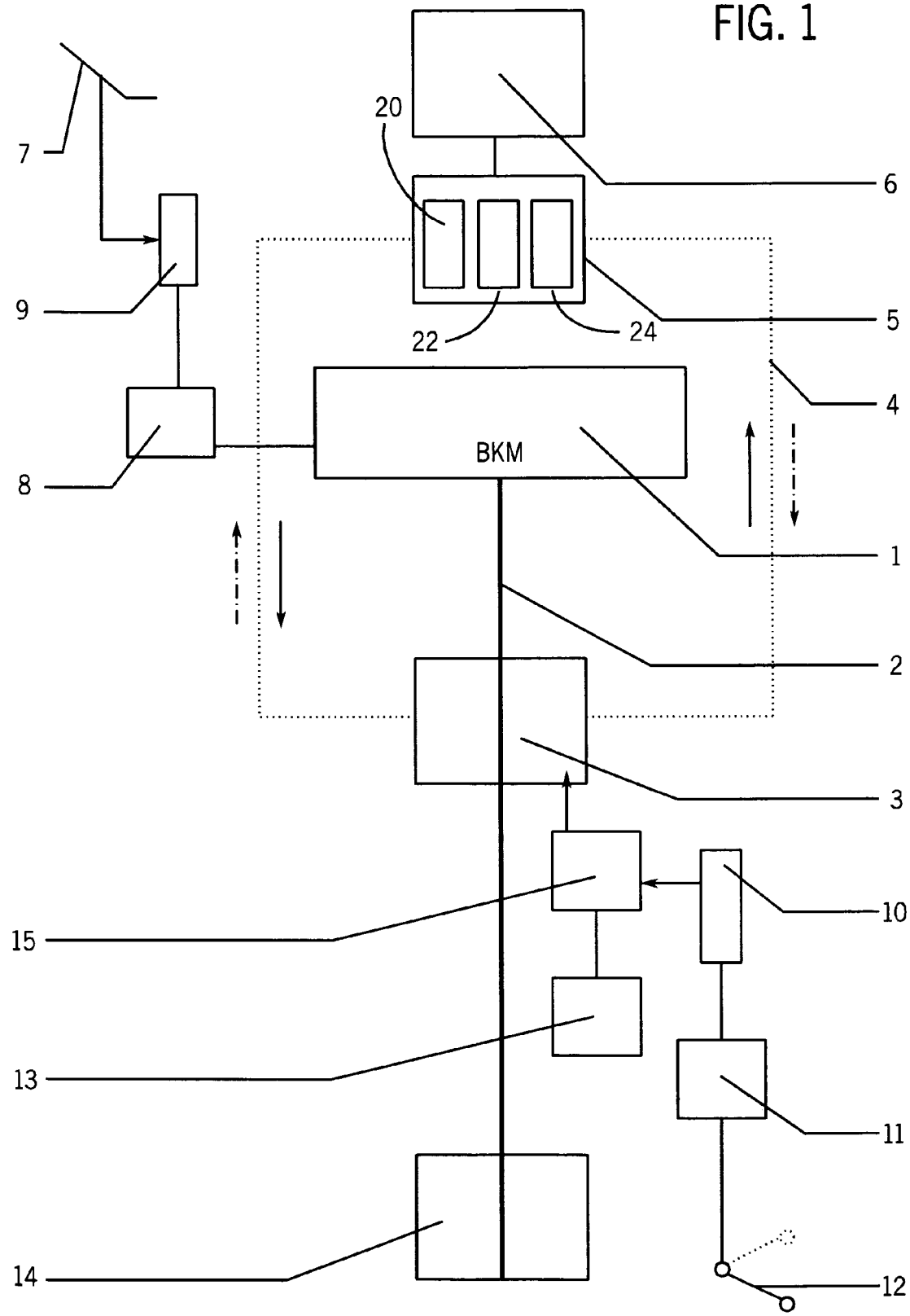
FIG. 1 is a block circuit diagram of the travelling gear for an agricultural working machine.

On a diesel engine (1) serving as a central motive power source for the agricultural working machine, a variable displacement pump (3) is tightly coupled to it via a central shaft (2). To the variable displacement pump (3) a hydraulic motor (5) is connected via a hydraulic line (4), which is followed by a running gear (6). The speed of the diesel engine (1) is adjusted either directly via an accelerator pedal (7) with a Bowden cable provided with a return spring or through an interposed engine electronic system (8). Setting of the speed of the diesel engine (1) is effected via the accelerator pedal (7). A potentiometer (9) coupled with the accelerator pedal (7) serves for producing an electrical signal corresponding to the instantaneous position of the accelerator pedal (7), which is transmitted as a proportional position signal to the injection pump of the diesel engine (1)

or is used for driving an engine electronic system. Thus the speed of the diesel engine (1) is not prescribed rigidly, but is determined by the instantaneous position of the accelerator pedal (7). As the variable displacement pump (3) of the hydraulic motor (5) is tightly coupled to the diesel engine (1), it is driven by it at a prescribed ratio to the speed of the diesel engine (1). The forwards or backwards travel of the running gear (6) is set by the variable displacement pump (3) by means of a direction of travel valve (10) (forwards/backwards). This direction of travel valve (10) serves during road operation only for setting forwards or backwards travel and the maximum travelling speed. The direction of travel valve (10) is actuated via a throttle lever (11). While doing so a control electronics system (12) remains in its starting position. The variable displacement pump (3) is subordinated to a pump control system, to which a control valve (13) and a feed pump (14) are connected in series. The feed pump (14) is built directly onto the variable displacement pump (3) or is built into it and is driven by it with a 1:1 ratio. It serves for feeding into the low-pressure side the measurement for the speed of the variable displacement pump (3) and for supplying a pump regulator (15) with control oil. The delivery stream is proportional to the speed of the diesel engine (1) and hence it represents the variable parameter (command signal) for the pump control.

The hydraulic control valve (13) is a combination of diaphragms, springs and regulating pistons. It serves for processing the volume flow (speed value) delivered by the feed pump (14) proportional to its speed into a corresponding control pressure, which is fed to the pump regulator (15). The pressure difference, which is produced in proportion to the volume flow delivered by the feed pump (14), results in a force on the regulating piston, which for its part opens the cross-section to the control line and thus builds up a control pressure, which is used for pump regulation and which at the same time produces high pressure in the circuit of the travelling gear. Through the selection of the diaphragms the characteristic curve of the control valve (13) can be adjusted and with it that of the travelling gear. The combination of diaphragms is so selected that when the diesel engine (1) is at idling speed no build up of control pressure occurs. Only on reaching a predetermined speed does the control valve (13) open. The variable displacement pump (3) begins to swing out. If the speed of the diesel engine (1) is raised further, a proportional excursion of the variable displacement pump (3) occurs. The speed, at which the control pressure attains a maximum value and the variable displacement pump (3) is fully swung out, can be selected according to the desired characteristic curve. The characteristic curve for swinging out is determined by an increase in the speed of the diesel engine (1) and by raising the control pressure. Both of these lead to an increase in speed of the hydraulic motor (5) on the power take-off side and hence to an increase in travelling speed.

In principle the reverse of this applies to an adjustment from a high to a lower speed. With the accelerator pedal (7) a reduction in the speed of the diesel engine (1) is prescribed. The delivery volume of the feed pump (14) falls in proportion with the speed. A smaller volume flows through the control valve (13), which for its part produces a smaller pressure drop. The control pressure, which is fed to the pump regulator (15), is reduced and the variable displacement pump (3) swings in proportionally to the speed of the diesel engine (1) in the said manner. If the speed of the diesel engine (1) is reduced to idling speed, the variable displacement pump (3) swings fully in and the hydraulic motor (5) is braked down to a standstill on the power take-off side.

With the accelerator pedal (7) the facility thus exists, to run up to any desired speed within a range and to transfer to an appropriate travelling speed. Accelerating and decelerating of the travelling gear for an agricultural working machine is controlled only via the accelerator pedal (7), through which the otherwise usual operation by means of the throttle lever (12) is omitted. Operation with the accelerator pedal (7) permits a considerably more measured and planned mode of driving. In addition the driver is freed from operation of the throttle lever (12) and thus he has both hands free for operating the steering.

It will be appreciated that, although the invention has been described with reference to a particular type of agricultural working machine, still other embodiments can be thought of without departing from the original idea of the invention as defined by the claims.

It will be understood that changes in the details, materials, steps and arrangements of parts that have been described and illustrated to explain the nature of the invention will occur to and may be made by those skilled in the art upon reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A method of regulating a travelling speed of an agricultural machine, the method comprising the steps of:
    providing a diesel engine to drive a variable displacement pump, the variable displacement pump connected by a hydraulic line to at least one hydraulic motor connected to a running gear so as to drive the agricultural machine at the travelling speed;
    measuring a speed of the diesel engine;
    providing a delivery volume from the variable displacement pump via the hydraulic line to the at least one hydraulic motor in proportion to the measured speed of the diesel engine; and
    braking the agricultural machine with the at least one hydraulic motor when the measured speed of the diesel engine is at a predetermined idling speed;
    wherein a speed of the at least one hydraulic motor controls the travelling speed of the agricultural machine.

* * * * *